US012599145B2

(12) United States Patent　　(10) Patent No.:　US 12,599,145 B2
　　Dubief et al.　　　　　　　　　　(45) Date of Patent:　　Apr. 14, 2026

(54) METHOD OF ROASTING

(71) Applicant: SOCIETE DES PRODUITS NESTLE S.A., Vevey (CH)

(72) Inventors: Flavien Florent Dubief, Champagne (CH); Nicolas Bigler, Morrens (CH)

(73) Assignee: Societe des Produits Nestle S.A., Vevey (CH)

( * ) Notice: Subject to any disclaimer, the term of this patent is extended or adjusted under 35 U.S.C. 154(b) by 700 days.

(21) Appl. No.: 17/996,945

(22) PCT Filed: Apr. 27, 2021

(86) PCT No.: PCT/EP2021/061004
　　§ 371 (c)(1),
　　(2) Date: Oct. 24, 2022

(87) PCT Pub. No.: WO2021/219650
　　PCT Pub. Date: Nov. 4, 2021

(65) Prior Publication Data
　　US 2023/0255228 A1　　Aug. 17, 2023

(30) Foreign Application Priority Data
　　Apr. 27, 2020　　(EP) ..................................... 20171659

(51) Int. Cl.
　　*A23F 5/04* 　　　　(2006.01)
　　*A23N 12/08* 　　　(2006.01)
　　*G05D 23/19* 　　　(2006.01)
(52) U.S. Cl.
　　CPC ................ *A23F 5/04* (2013.01); *A23N 12/08* (2013.01); *G05D 23/1904* (2013.01)

(58) Field of Classification Search
　　CPC .. A23N 12/125; A23N 12/08; G05D 23/1904;
　　　　　　　　　　　　　　　　　　　　A23F 5/04
　　(Continued)

(56) References Cited

U.S. PATENT DOCUMENTS 4,501,761　A　　2/1985　Mahlmann et al.
6,053,093　A　　4/2000　Gerhardt et al.
　　　　　　　　(Continued)

FOREIGN PATENT DOCUMENTS

CN　　　101056559　A　　10/2007
CN　　　102232797　A　　11/2011
　　　　　　　　(Continued)

OTHER PUBLICATIONS

Russian Office Action for Appl No. 2022127861/07 dated Aug. 7, 2024, 4 pages.
　　(Continued)

*Primary Examiner* — Subbalakshmi Prakash
(74) *Attorney, Agent, or Firm* — K&L Gates LLP

(57) ABSTRACT

The invention concerns a method of roasting coffee beans with a roasting apparatus (X), said roasting apparatus comprising a control system (80) configured to control the heating device (2) and to reproduce roasting recipes, said control implementing a feedback loop regulation based on the temperature Treg measured by the at least one temperature probe (5), wherein, before roasting coffee beans by reproducing coffee beans roasting recipes defined with one specific master roasting apparatus (M), the feedback loop regulation is adjusted, said operation of adjustment comprising the step applying pre-determined correction KC to the feedback loop regulation.

17 Claims, 6 Drawing Sheets

(58) Field of Classification Search
USPC .................................................. 426/466, 250
See application file for complete search history.

(56) References Cited

U.S. PATENT DOCUMENTS

| | | | |
|---|---|---|---|
| 2004/0074400 | A1 | 4/2004 | Song |
| 2006/0266229 | A1 | 11/2006 | Ribich |
| 2012/0265364 | A1 | 10/2012 | Zambrano |
| 2013/0019756 | A1 | 1/2013 | Coats et al. |
| 2014/0314923 | A1 | 10/2014 | Sewell et al. |
| 2016/0120211 | A1 | 5/2016 | Wilson et al. |
| 2016/0295906 | A1 | 10/2016 | Jacobsen et al. |
| 2017/0082996 | A1 | 3/2017 | Koennings et al. |
| 2019/0208798 | A1 | 7/2019 | Voges et al. |

FOREIGN PATENT DOCUMENTS

| | | | |
|---|---|---|---|
| JP | 2004105185 | A | 4/2004 |
| JP | 2016536989 | A | 12/2016 |
| JP | 2018113958 | A | 7/2018 |
| JP | 2019017293 | A | 2/2019 |
| RU | 2009123097 | A | 2/2011 |
| WO | 2016071165 | A1 | 5/2016 |
| WO | 2016142167 | A1 | 9/2016 |

OTHER PUBLICATIONS

Botha, Cecilia Margaretha "A model-based control system design for a coffee roasting process" NWU Dissertation, Aug. 1, 2018, retrieved from the Internet: https://repository.nwu.ac.za/bitstream/handle/10394/30621/Botha_CM_2018.pdf?sequence=1&isAllowed=y, 195 pages.

Brazil Office Action for Appl No. BR112022020091-9 dated Jul. 19, 2024, 5 pages.

Japanese Office Action for Appl No. 2022-563948 dated Feb. 12, 2025, 3 pages.

Chinese Office Action for Appl No. 202180031493.3 dated Apr. 30, 2025, 7 pages.

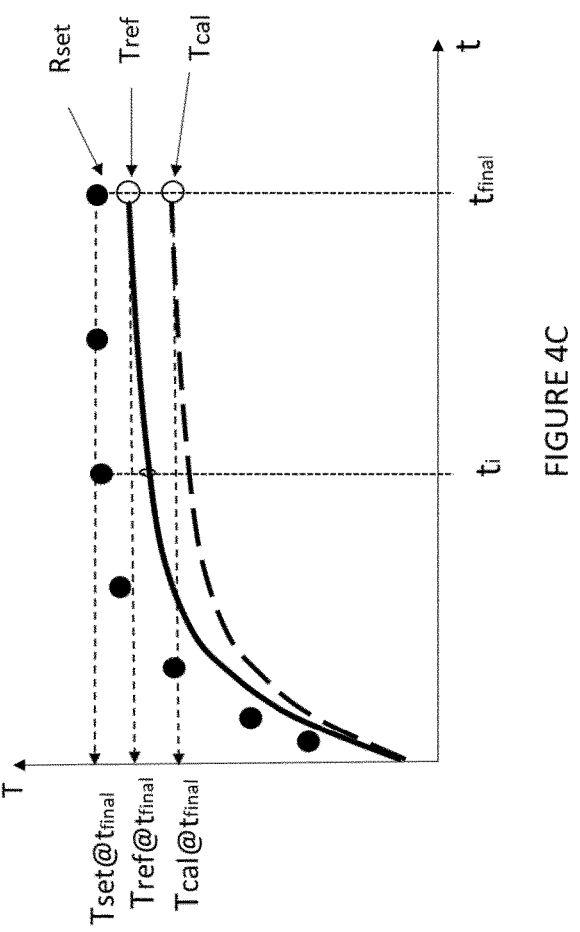
FIGURE 4C
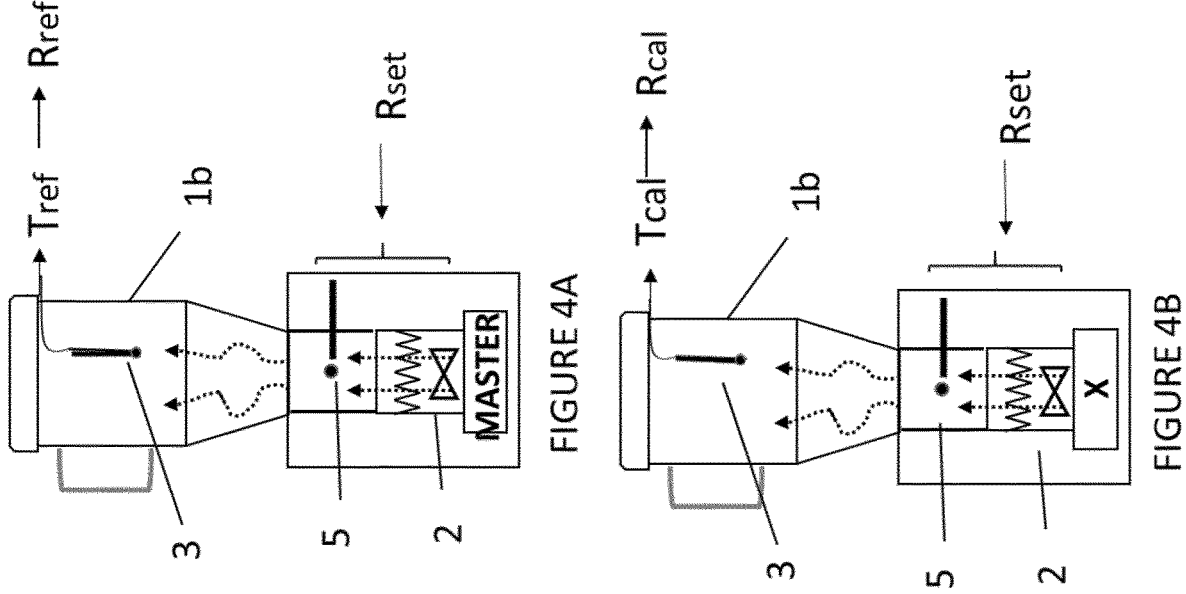
FIGURE 4A
FIGURE 4B

METHOD OF ROASTING

CROSS REFERENCE TO RELATED APPLICATIONS

The present application is a National Stage of International Application No. PCT/EP2021/061004, filed on Apr. 27, 2021, which claims priority to European Patent Application No. 20171659.4, filed on Apr. 27, 2020, the entire contents of which are being incorporated herein by reference.

FIELD OF THE INVENTION

The present invention relates to coffee beans roasting apparatuses and the method to calibrate such apparatuses.

BACKGROUND OF THE INVENTION

The roasting of coffee beans consists in introducing coffee beans in a roasting chamber and applying heating to said beans.

Generally, the roasting apparatus comprises a chamber to contain coffee beans, a heating device to heat air supplied to the chamber, a temperature probe to regulate the temperature supplied by the heating device and a controller which is in operative communication with the temperature probe and the heating device. The controller operates to activate and deactivate the heating device. The controller has stored therein, a predefined roast profile, which comprises a plurality of data points corresponding to a particular time and temperature. The controller operates on a periodic basis to read a roast control signal value, correlate that roast control signal value with the roast profile, and control the operation of the heating device so as to maintain the temperature of the coffee beans in accordance with the roast profile.

In fact, the controller implements a feedback loop regulation based on the temperature measured by the at least one temperature probe. Feedback loop regulation such as described in US 2006/266229 or publication XP055725065 can be implemented.

This predefined roast profile is usually defined for a particular type of coffee beans and by a coffee expert. The roast profile is defined to provide the optimal roasting of this type of coffee beans. Reproducing this roast profile is a guarantee of not wasting beans and to obtain roasted coffee beans with optimal taste when coffee is prepared therefrom. Usually this predefined roast profile is defined by the coffee expert with a specific roasting apparatus used in specific conditions.

In addition, when a type of beans is sold continuously, it is expected that, based on the predefined roast profile, any roasting apparatus is able to roast this type of beans consistently and that the same final roasted beans are obtained again. Accordingly, if a new batch of this type of coffee beans is ordered and roasted, the roasting apparatus applying the same roasting profile must reproduce the same final roasted beans consistently.

The consistent reproduction of the predefined roast profile of specific coffee beans within different roasting apparatuses can be difficult for several two reasons.

The roasting profile or recipe is initially defined by a coffee expert for a specific type of beans with a specific roasting apparatus used in specific conditions.

When this roasting profile is reproduced for the same type of beans in other roasting apparatuses, several operating conditions can differ:

the roasting apparatus can be slightly different. For example, even if the roasting apparatus is sold with the same reference, different batches of production are produced under the same reference and each batch may comprise different internal components assembled in a different manner from the other batches. These differences may directly impact the manner the beans are roasted.

the type of beans can be slightly different. For example, the beans may have been stored in various conditions and their moisture content may vary or the pre-treatment of the beans may have changed.

the quantity of beans used during the roasting operation may differ, the ambient conditions used during the initial definition of the roasting profile may differ from the ambient conditions used during the reproduction, like the ambient temperature, the ambient pressure, the ambient humidity, the altitude.

All these differences impact more or less the consistent reproduction of the roasting profile. The difference can vary one day to another depending on the weather, one roasting to another depending on the quantity of beans to be roasted, on the new supply of beans, . . .

An object of the present invention is to provide a solution to this problem of consistently roasting the same roasting profile for the same type of beans in different roasting apparatuses and within different conditions.

SUMMARY OF THE INVENTION

In a first aspect of the invention, there is provided a method of roasting coffee beans with a roasting apparatus (X), said roasting apparatus comprising:

a chamber to contain coffee beans, a heating device configured to supply a flow of hot air to the chamber, at least one temperature probe to measure the temperature of air supplied by the heating device, a control system configured to control the heating device and configured to reproduce roasting recipes, said roasting recipes representing the temperature to be applied at discrete successive times $t_i$, respectively, said control of the heating device implementing a feedback loop regulation based on the temperature $T_{reg}$ measured by the at least one temperature probe, wherein, before implementing a new operation of roasting coffee beans with the roasting apparatus (X) by reproducing coffee beans roasting recipes $R_{set}$, said roasting recipes $R_{set}$ providing at least a set of points $(T_{set@ti}; t_i)$ defined with one specific master roasting apparatus (M), the feedback loop regulation is adjusted, said operation of adjustment comprising the steps of:

supplying at least one of the conditions Ci of the new operation of roasting, comparing each supplied condition Ci of the new operation of roasting with the corresponding condition of reference $C_{iref}$ originally applied during the definition of the roasting recipes $R_{set}$ with said specific master roasting apparatus (M), if a difference is identified between said supplied condition Ci of the new operation of roasting and the corresponding condition of reference $C_{iRef}$, then:

based on said identified difference, getting access to a corresponding pre-determined correction $K_{Ci}$ specific to the nature and the difference with $Ci\text{-}_{ref}$ of said condition of roasting, and applying said corresponding pre-determined correction $K_{C_i}$, directly or indirectly to at least one of the temperatures $T_{set@ti}$ of the roasting recipes to be reproduced by the roasting apparatus (X)

The method relates to the roasting of coffee beans in a coffee beans roasting apparatus (X) in order to make it consistent in the reproduction of coffee beans roasting recipes that were defined with one specific master roasting apparatus (M). Generally the coffee beans roasting recipes $R_{set}$ defined with the specific master roasting apparatus (M) are roasting recipes $R_{M_n}$ adapted to the roasting of one pre-determined quantity $M_n$ of beans of same type $C_n$ and providing the temperatures $T_{M_n@t_i}$ to be applied at discrete successive times t respectively. Usually, a roasting recipe is defined for a specific type of coffee beans (or a specific blend of different beans) by a coffee expert operating one particular roasting apparatus in specific conditions (for example, the roasting recipe is usually defined at specific ambient temperature and ambient humidity, with a specific quantity of beans, the beans presenting a certain moisture level). This roasting apparatus with which the expert has defined the roasting recipes is defined as the master roasting apparatus.

The method aims to enable the consistent reproduction of the coffee beans roasting recipes defined with the specific master roasting apparatus (M) with other apparatuses (X) that are usually manufacturing copies of the specific master roasting apparatus (M).

The method is applied on a coffee beans roasting apparatus comprising at least: a chamber to contain coffee beans, a heating device, at least one temperature probe to regulate the temperature supplied by the heating device and a control system.

The method can be applied to any type of roasting apparatus such as described above.

The chamber is designed to contain coffee beans during the roasting process. In the chamber, coffee beans are heated and preferably mixed to homogenise heating through the beans. Mixing can be obtained with a fluidic bed of hot air or mechanically with stirring blades or through rotation of a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively, the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The chamber usually comprises an outlet from which smoke and chaffs produced during the roasting operation can be evacuated.

The heating device heats air supplied to the chamber in order to heat coffee beans contained in the chamber Preferably, the heating device is configured to produce a flow of hot air, said flow of hot air being directed to the coffee beans contained in the chamber in order to heat them. Usually, the heating device comprises at least an air driver and a heater to heat the flow of air produced by the air driver.

The heating device can comprise a burner (meaning combustion) fed by natural gas, liquefied petroleum gas (LPG) or even wood. Alternatively, the heating device can comprise an electrical resistor, a ceramic heater, a halogen source, a source of infrared and/or a source of microwaves.

Preferably the heating device is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The apparatus comprises at least one temperature probe to regulate the temperature supplied by the heating device. The temperature measured by this probe is used as an input data of the control system in feedback loop control. Preferably, this temperature probe is positioned outside the chamber meaning that it does not contact the coffee beans during the roasting operation. Preferably, this first probe is positioned in the apparatus in order to measure the temperature of hot air supplied to the chamber, that is usually between the heating device and the chamber.

In order to improve the accuracy of the measure of hot air supplied to the chamber, the apparatus can comprise at least two temperature probes. These probes can be positioned in a conduit configured to drive the flow of hot air from the heating device to the chamber, preferably in a local transversal constriction of said conduit, each probe being positioned at different radial positions in said local transversal constriction.

Optionally, the apparatus can comprise another probe downstream the chamber. Yet, this position of this probe downstream the chamber is less preferred due to the contact with smoke emitted roasting operation resulting in dirtiness and impact on the accurate measure of temperature.

Less preferably, a temperature probe can be positioned inside the chamber.

The control system of the apparatus is operable to control the heating device in order to reproduce roasting recipes, said roasting recipes providing at least a set of points ($T@t_i$; $t_i$) representing the temperature to be applied at discrete successive times $t_i$, respectively. This control of the heating device is based on the implementation of a feedback loop regulation based on the temperature $T_{reg}$ measured by the at least one temperature probe in a feedback loop control. The feedback loop regulation usually consists in a comparison of the measured temperature $T_{reg}$ with the temperature T to be applied and then, based on the comparison, in controlling the heating device following a pre-defined rule. Such feedback loop regulation is well-known from the state of the art.

If the apparatus comprises more than one probe, the average value of the measures of all said probes can be used by the control system as the temperature $T_{reg}$ in feedback loop regulation.

Before roasting coffee beans by reproducing coffee beans roasting recipes defined with one specific master roasting apparatus (M), the feedback loop regulation is adjusted.

This operation of adjustment comprises a first step of supplying at least one of the current conditions Ci of the new roasting operation. These conditions relate to the particular state in which the roasting operation is going to happen. Depending on the roasting apparatus, these conditions can relate at least to one condition such as:

the external ambient conditions such as: the ambient temperature ($C_{temp}$), the ambient humidity ($C_{humid}$), the pressure ($C_{press}$), the altitude ($C_{alt}$), the type of roasting apparatus used, defined in particular by its internal components and the assembly of these components. This type can be identified by a manufacturing series reference ($C_{serie}$).

if the heating device is electrically powered, the type of source of power, the frequency or the voltage, ($C_{power}$), if the heating device is powered by at least one gas burners, the parameters ($C_{gas}$) of supply of the gas, such as the type of used gas, the pressure of said used gas and/or the flow of said used gas, the characteristics of the coffee beans to be roasted such as: the quantity m of coffee beans used (Cm), the moisture level of the coffee beans ($C_{moist}$), a variation in the characteristics of the type of coffee beans such as for example the density that can vary with seasonality ($C_{beans\ properties}$), the characteristics of the desired aroma profile such as the level of roasting. This condition is supplied when the operator desires to change the usual aroma profile provided by the roasting of specific type of coffee beans by reproducing coffee beans roasting recipes defined with the specific master roasting apparatus (M). The operator may want to get roasted beans with a lighter or stronger aroma profile and is provided the ability to change this characteristic of the roasted beans.

At least one of these conditions can be supplied by the operator through a user interface of the roasting apparatus proposing all or some of these conditions.

Alternatively, some of these conditions can be automatically supplied to the control system:

the type of roasting apparatus can be stored in the memory of the control system, the type of source of power can be stored in the memory of the control system, the atmospheric conditions can be read from sensors part of or external to the roasting apparatus.

As for the characteristics of the coffee beans to be roasted, the conditions can relate to differences with the conditions used during the definition of the roasting recipe of said beans with the specific master roasting apparatus. Usually, the coffee beans roasting recipes defined with the specific master roasting apparatus (M) are roasting recipes $R_{M_n}$ adapted to the roasting of one pre-determined quantity $M_n$ of beans of same type Coffee$_n$ and providing the temperatures $T_{M_n@t_i}$ to be applied at discrete successive times $t_i$ respectively.

Consequently, if the operator modifies the quantity of said beans compared to the quantity used in the definition of the roasting recipes $R_{M_n}$, then the operation may be adjusted.

The quantity m of each type of coffee beans introduced in the chamber can be obtained:

from the operator. In that case, the apparatus can comprise a user interface to enable the user to enter the quantity of beans she/he is introducing inside the chamber. This quantity can be entered through the interface of a mobile device configured to communicate with the control system of the apparatus.

or from a measuring device connected to the control system of the apparatus. In that case, the measure of the quantity m of the beans can be automatically provided to the control system of the apparatus.

In addition, beans to be roasted are submitted to various pre-treatments before being roasted. The simplest pre-treatment leads to green beans and an additional pre-treatment is the partial pre-roasting of beans that is beans having been obtained by heating green coffee beans and stopping said heating process before the end of the first crack. These partially pre-roasted beans can be pre-roasted at different levels with a direct impact on their moisture level. Whereas green beans can present a moisture level of about 10 to 12% in weight, partially pre-roasted beans can present a moisture level of about 3 to 5% in weight. These values reflect the moisture levels just after the pre-treatment, that is when the beans are packaged in containers for shipping from the factory to the operator. These values can vary along the shelf life of the beans depending on the conditions of storage such as the tightness of the container, the ambient conditions of storage (in temperate, cold or hot climate). In addition, for one type of beans Coffee$_n$, the usual moisture level at the outlet of the factory may temporary change for various reasons (seasonality, new supplier, new pre-treatment)

It means that the moisture level of beans change and that the roasting of coffee beans Coffee$_n$ by reproduction of the roasting recipe $R_{M_n}$ of said coffee beans by the roasting apparatus X may not be consistent with the usual and expected roasting because the moisture level of the beans is higher or lower than in the conditions of reference.

The moisture level of the beans before initiating the roasting operation can be sensed by a device equipped with a moisture level sensor before the beans are introduced inside the roasting apparatus X.

Alternatively, the moisture level can be predicted from the original moisture level of the beans at the outlet of the factory and the further conditions of storage like the period of storage, the type of storing container and/or the place of storage.

In one embodiment, information about the original moisture level of the beans and the evolution in time of said level can be provided directly or indirectly from the beans container itself.

In the most directly manner, the container can present information about the evolution of the moisture level with time, for example providing indications about moisture level per age period.

This level can be supplied to the control system either manually or indirectly by code reading, the code supplying that piece of information.

Alternatively, the level can be deduced from the beans reference that can be manually inputted or automatically read for example by a code reader. This reference associated to the date of reading can provide indirectly the moisture level by a reference to a lookup table or a rule linking the type of beans, the type of container and the storing time with the moisture level at the date of roasting.

In addition, as mentioned above, the factory may produce coffee beans Cn with other different properties than moisture level due to change in the supply from farmers, due to seasonality, due to change in the pre-treatment like drying, washing or unwashing treatment. Although the produced beans are close to the original ones, applying the roasting recipe defined with the master roasting apparatus may lack consistency compared to the expected usual final roasted beans.

Another condition can relate to the characteristics of the aroma profile desired by the operator. As mentioned earlier, the roasting recipe are defined by a coffee expert that defines the aroma profile of the roasted beans according its own taste or reflecting the aroma of the products of one specific company or as sensory target. The operator of the roasting apparatus may desire to adapt the aroma profile. Generally, this characteristic refers to the level of roasting of the beans resulting from the temperature recipe applied to the beans.

Then, in a further step of the operation of adjustment, each of said supplied conditions C of roasting is compared with the corresponding condition of reference $C_{-i-ref}$ that has been applied during the definition of the roasting recipes with the specific master roasting apparatus (M).

Then, if a difference is identified between one supplied condition Ci of the new operation of roasting and the corresponding condition of reference $Ci_{Ref}$ used with specific master roasting apparatus (M), then, based on said identified difference, the control system is configured to get access to a corresponding pre-determined correction $K_{Ci}$ specific to the nature and the difference with $Ci_{Ref}$ of said condition of roasting and said identified difference.

Accordingly, said correction varies according to:
the nature of the different condition and
the level of difference with the corresponding condition of reference $Ci_{Ref}$ used with specific master roasting apparatus.

Each correction is adapted for a specific condition and a specific difference.

The correction Kci can be stored in a database or a memory accessible to the control system of the apparatus.

If a difference is identified for several conditions Ci of roasting, the control system is configured to get access to each pre-determined correction $K_{Ci}$ specific to each condition Ci of roasting different from the corresponding condition of reference $Ci_{Ref}$ used with specific master roasting apparatus.

These corrections Kci are usually predetermined by experimentation on the specific master roasting apparatus (M) by implementing roasting operations while applying specific difference with the conditions of reference.

Finally, the corresponding pre-determined correction Kci specific to said condition of roasting is applied to the feedback loop regulation.

Preferably this correction $K_{Ci}$ is applied directly to at least one of the temperatures $T_{set@ti}$ of the roasting recipes to be reproduced by the roasting apparatus (X).

Alternatively, in a so-called "indirect" manner, this correction can be applied to the temperature $T_{reg}$ measured by the temperature probe (5) of the roasting apparatus (X).

Accordingly, the method enables the correction of the target temperature to be reproduced in the feedback loop regulation taking into account the specific differences with the conditions used during the establishment of the roasting profiles with the master roasting apparatus.

Depending on the type of correction, the feedback loop regulation can be adjusted:
at installation, for example for correction corresponding to the type of roasting apparatus used, the source of electrical power and/or the aroma profile desired by the operator,
periodically, for example for correction corresponding to the external ambient conditions (depending on seasons, depending on upgrade of the roasting apparatus), and/or
before each roasting operation, for example for correction corresponding to the quantity of beans, the moisture level of beans.

In a particular embodiment of the method of roasting and for particular conditions Ci, the feedback loop regulation can be adjusted before and during the new operation of roasting coffee beans.

According to that embodiment, during the new operation of roasting coffee beans with the roasting apparatus (X), at least one of the conditions Ci of the new operation of roasting is monitored, preferably the external ambient conditions such as temperature and/or pressure,
and
if said at least one monitored condition Ci changes during the new operation of roasting coffee beans, then the steps of the operation of adjustment are implemented again.

In particular, the following steps are implemented:
comparing the new changed monitored condition Ci of the new operation of roasting with the corresponding condition of reference $Ci\text{-}_{ref}$ originally applied during the definition of the roasting recipes $R_{set}$ with said master roasting apparatus (M),
if a difference is identified between said supplied condition Ci of the new operation of roasting and the corresponding condition of reference $Ci_{Ref}$, then:
based on said identified difference, getting access to a corresponding pre-determined correction $K_{Ci}$ specific to the nature and the difference with $CiR_{ef}$ of said condition of roasting, and
applying said corresponding pre-determined correction Kci t directly or indirectly to at least one of the temperatures $T_{set@ti}$ of the roasting recipes to be reproduced by the roasting apparatus (X)

This particular embodiment can be applied for roasting apparatus influenced by a change of the ambient temperature, for example if the apparatus is positioned in a vast room or shed and the temperature can rapidly change when a door is opened to the outside. Similarly, if the roasting apparatus is placed in a room placed under pressure due to room air conditioning, the supply of oxygen to the gas burner gas can be directly influenced by long door opening.

Depending on the type of the condition, the difference between the master apparatus M and the roasting apparatus X, the correction can be a multiplication factor, the combination of a multiplication factor and an offset, a correction based on a polynomial formula, a correction based on a log type formula or an offset only. Usually, the correction can be determined via well-known mathematical regression methods establishing relationship between the new temperature to be applied and $Tset@t_i$.

According to the preferred embodiment, the pre-determined correction $K_{Ci}$ specific to one condition Ci of roasting applied to the feedback loop regulation is defined by a coefficient $a_{ci}$, and
said correction is applied to the temperatures $T_{set}$ provided by the roasting recipes to be reproduced, said correction comprising replacing $T_{set}$ by $a_{ci}T_{set}$ in the feedback loop regulation,
or
said correction is applied to the temperatures $T_{reg}$ measured by the at least one temperature probe, said correction comprising replacing $T_{reg}$ by:

$$\frac{T_{reg}}{a_{ci}}$$

in the feedback loop regulation, wherein $a_{ci}$ is a pre-determined factor specifically pre-determined for said condition C and the identified difference, or is equal to 1 by default. The value by default can be used if the control system cannot get access to a corresponding pre-determined correction, for example because the correction relates to a new type of beans, because the difference with the condition of reference is outside the scheduled conditions, because the operator decides to deactivate the operation of adjustment at least for one condition (the user interface of the roasting apparatus can be provided with a settings page accessible to the operator and enabling the operator to configure the list of corrections by default or not) or because at least one of the condition cannot be supplied (broken sensor, unavailable condition, unreadable code on a packaging (damaged code or code reader not operating)).

In one mode, the default value can be applied each time there is no difference with the conditions of reference if the control system is configured to check each condition whether different or not from the conditions of reference.

With that preferred embodiment, the operation of adjustment can comprise the steps of:

supplying several specific conditions of roasting Ci, comparing each one of the specific conditions of roasting Ci with the corresponding condition of reference used during the definition of the roasting recipes defined with said specific master roasting apparatus (M), if for more than one of the specific conditions Ci of roasting, a difference is identified between the specific condition of roasting and the corresponding condition of reference, then:

based on each of the identified differences, getting access to the corresponding pre-determined corrections Kci specific to conditions Ci of roasting, based on the selection of said corresponding pre-determined corrections $K_{ci}$, applying the correction K to the feedback loop regulation, said correction K being defined by the coefficient A wherein $A=\Pi_i a_{Ci}$.

With that preferred embodiment, the coffee beans can be a blend of at least two different coffee beans (coffee A, coffee B, . . . , coffee N) introduced inside the chamber, and the control system can be configured to obtain for each type of coffee beans coffee n comprised in said blend at least the type coffee n of said coffee beans and the quantity $m_n$ of said type of coffee n introduced in the chamber, and, if for at least one type of said coffee n part of the blend, at least one difference is identified between the specific condition $C_{coffee\ i}$ of roasting related to a characteristic of said coffee n and the corresponding condition of reference $C_{coffee\ i\ Ref}$ of roasting related to said characteristic of said coffee n then a global coefficient $a_{C\ coffee\ i\ blend}$ for the correction Kc coffee i specific to the condition C coffee i of roasting for the blend can be calculated, said global coefficient being calculated as follows:

$$a_{C\,coffee\,i\,blend} = \sum_{n=A}^{N} f_n \cdot a_{C\,coffee\,i\,n}$$

wherein n corresponds to all the types of coffee beans $C_A$ to $C_N$ present in the blend and $f_n$ represents the fraction in weight of coffee beans of type $C_n$ in the blend of coffee beans.

This situation corresponds to the case where recipe for specific blends of different coffees can be roasted. The blends are defined by the types of coffees and the quantities of said coffees present in the blend, the roasting recipe of said blends are defined with the master roasting apparatus. If these blends are not sold as such but are prepared by the operator just before the roasting operation by measuring manually the quantities of each type of beans according to the pre-defined recipe of the blend, the characteristics of at least some of the beans part of the blend can be different from those characteristics during the definition of the roasting recipe with the master roasting apparatus. For example, one or more beans can present a moisture level that is different on account of their specific shelf life or storing conditions. In that case, a correction specific to moisture level must be applied in the correction. Due to the fact that the beans represent a specific fraction of the beans, a global correction specific to moisture level is calculated for the blend and this global correction specific to moisture level is then applied to the feedback loop regulation, either alone if it is only different condition, or with the other correction if other different conditions happen.

In a particular mode of the above preferred embodiment, the pre-determined correction $K_{ci}$ specific to one condition Ci of roasting applied to the feedback loop regulation can be defined by an additional coefficient $b_{ci}$, and said correction can be applied to the temperatures $T_{set}$ provided by the roasting recipes to be reproduced, said correction comprising replacing $T_{set}$ by $a_{ci}T_{set}+b_{ci}$ in the feedback loop regulation, or said correction can be applied to the temperatures $T_{reg}$ measured by the at least one temperature probe, said correction comprising replacing $T_{reg}$ by $$\frac{1}{a_{ci}}(T_{reg} - b_{ci})$$

in the feedback loop regulation, wherein $b_{ci}$ is a pre-determined offset specifically pre-determined for said condition Ci and the identified difference or is equal to 0 by default.

With the previous particular mode, the operation of adjustment can comprise the steps of:

supplying several specific conditions of roasting Ci, comparing each one of the specific conditions of roasting Ci with the corresponding condition of reference used during the definition of the roasting recipes defined with said specific master roasting apparatus (M), if for more than one of the specific conditions Ci of roasting, a difference is identified between the specific condition of roasting and the corresponding condition of reference, then:

based on each of the identified differences, getting access to the corresponding pre-determined corrections Kci specific to conditions Ci and said identified difference of roasting, based on said corresponding pre-determined corrections Kci, applying the correction K to the feedback loop regulation, said correction K being defined by the couple of values (A, B), wherein:

$A=\Pi_i a_{Ci}$ and $B=\Sigma_i b_{Ci}$.

With the preferred embodiment, in the coefficients $a_{ci}$, and optionally $b_{ci}$, defining a correction $K_{ci}$, at least one of the coefficient can vary with time during the reproduction of roasting recipes. In particular, these values can be constant over different time intervals.

Similarly, in this preferred embodiment, in the coefficients $a_{ci}$, and optionally $b_{ci}$, defining a correction $K_{ci}$, at least one of the coefficients can vary with temperature during the reproduction of roasting recipes.

As mentioned above, other types of correction can be implemented, such as a polynomial function of second degree: in that case, the pre-determined correction $K_{ci}$ specific to one condition Ci of the new roasting operation is defined by the coefficient $D_{ci}$, $A_{ci}$, and $B_{ci}$ and said coefficients are directly applied to the temperatures $T_{set}$ provided by the roasting recipes defined with the specific master roasting apparatus (M) and to be reproduced, said correction comprising replacing $T_{set}$ by $D_{ci}T_{set}^2+A_{ci}T_{set}+B_{ci}$ in the feedback loop regulation, wherein $D_{ci}$ is a pre-determined factor specifically pre-determined for said condition Ci and the identified difference, or is equal to 0 by default, wherein $A_{ci}$ is a pre-determined factor specifically pre-determined for said condition Ci and the identified difference, or is equal to 1 by default, wherein $B_{ci}$ is a pre-determined factor specifically pre-determined for said condition Ci and the identified difference, or is equal to 0 by default, Preferably, in the roasting apparatus, the at least one temperature probe is positioned outside the chamber and each pre-determined correction specific to one condition of roasting and one identified difference is pre-determined by:

a0—applying the specific difference of condition to the master roasting apparatus M without modifying the other conditions of reference, a—introducing at least one temporary temperature probe inside the chamber of the master roasting apparatus M, b—controlling the heating device to reproduce a preset curve $R_{set}$, said preset curve providing a series of points $(T_{set@ti}; t_i)$ representing the temperature $T_{set@t1}$, $T_{set@t2}$, . . . $T_{set@tfinal}$ to be applied at preset corresponding successive times $t_1, t_2, \ldots, t_{final}$ respectively, said control being based on the temperature $T_{reg}$ measured by the temperature probe, c—during the reproduction of the preset curve $R_{set}$, measuring the temperature $T_{cal}$ in function of time inside the chamber at the temporary temperature probe (3) enabling the determination of at least a set of points $(T_{cal@ti}; t_i)$, d—comparing the temperature $T_{cal@ti}$ measured at at least one time $t_i$ with the temperature $T_{ref@ti}$ at said same time $t_i$ of a pre-determined reference curve $R_{ref}$ obtained with the master roasting apparatus (M), said reference curve $R_{ref}$ representing the temperature $T_{ref}$ measured in the chamber of the specific master apparatus (M) in the conditions of reference while controlling the heating device of the master apparatus to reproduce said preset curve $R_{set}$, based on the comparison, determining the correction specific to said condition of roasting and said difference.

In one particular embodiment, the heating device can comprise an air flow driver and the control system can be operable to control said air flow driver and can be configured to apply a roasting recipe ($R_{Flow-set}$) providing setpoints $(F@_{ti}; t_i)$ of an air flow $F@_{t1}$, $F@_{t2}$, . . . to be applied at discrete successive times $t_1, t_2, \ldots$, respectively, and the operation of adjustment can comprise the steps of: if a difference is identified between said supplied condition Ci of the new operation of roasting and the corresponding condition of reference $Ci_{Ref}$, then:

based on said identified difference, getting access to a corresponding pre-determined correction $K_{Flow\ Ci}$ specific to the nature and the difference with $CiR_{ef}$ of said condition of roasting, and applying said corresponding pre-determined correction $K_{Flow\ Ci\ t}$ directly or indirectly to at least one of the air flow $F_{set@ti}$ of the roasting recipes to be reproduced by the roasting apparatus (X)

In this embodiment, the general principle described above for a roasting recipe based on temperature along time is applied in a similar manner to a roasting recipe based on flow along time.

The principle can be applied to the roasting recipe based on temperature along time and/or on the recipe based on flow along time.

In a second aspect, there is provided a roasting apparatus comprising:

a chamber to contain coffee beans, a heating device configured to supply hot air to the chamber, at least one temperature probe to measure the temperature of air supplied by the heating device, preferably said at least one temperature probe being positioned outside the chamber, a control system configured to control the heating device and configured to reproduce roasting recipes, said roasting recipes providing at least a set of points $(T@_{ti}; t_i)$ representing the temperature to be applied at discrete successive times $t_i$, respectively, said control of the heating device implementing a feedback loop regulation based on the temperature $T_{reg}$ measured by the at least one temperature probe, wherein the control system is operable to implement the method such as described above.

In the present description, the terms curve, profile or recipe can be equally used and define at least a set of discrete points $(T@_{ti}; t_i)$ representing the temperature $T@_{ti}$ to be applied at discrete successive times $t_i$.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

Roasting Apparatus

Figure 1:
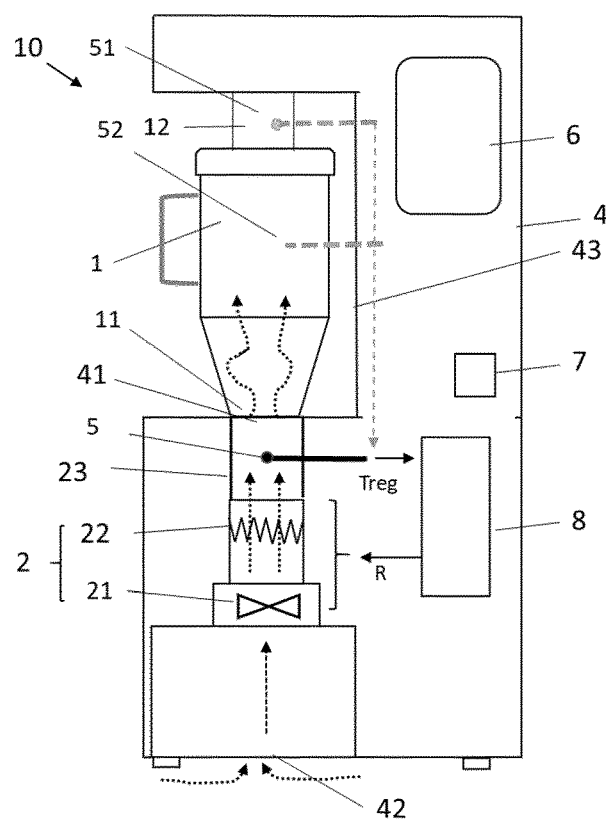
FIG. 1 is a schematic view of a roasting apparatus wherein the method of the present invention can be implemented.

FIG. 1 shows an illustrative side view part of a roasting apparatus 10. Functionally, the roasting apparatus 10 is operable to roast coffee beans hold in a chamber 1 by means of a flow of hot air introduced inside this chamber. At a first level, the apparatus comprises: a housing 4, a roasting unit and a control system 80. These components will now be sequentially described.

Roasting Unit of Roasting Apparatus

The roasting unit is operable to receive and roast coffee beans.

The roasting unit typically comprises at a second level of the roasting apparatus 10: a chamber 1 and a heating device 2, which are sequentially described.

The chamber 1 is configured to receive and hold the coffee beans introduced by the operator.

In the preferred embodiment, the chamber 1 is removable from the housing 4. The chamber can be put aside the roasting apparatus:

for the introduction or the removal of coffee beans, or for cleaning and maintenance of the chamber once it is removed, or for cleaning of the vertical housing part 43 behind the chamber.

The bottom opening 11 of the chamber is configured to enable air to pass through, specifically it can comprise a perforated plate on which the beans can lie and through which air can flow upwardly. The chamber 1 comprises a handle in order to enable the user to remove the chamber from the housing and hold it outside the housing.

A chaff collector 15 is in flow communication with the chamber outlet 12 through a smoke conduit 14 that receive chaffs that progressively separate from the beans and due to their light density are blown off to the chaff collector with smoke.

The heating device 2 comprises an air flow driver 21 and a heater 22.

The air flow driver 21 is operable to generate a flow of air (dotted lines arrows) in direction of the bottom 11 of the chamber. The generated flow is configured to heat the beans and to agitate and lift the beans. As a result the beans are homogenously heated. Specifically, the air flow driver can be a fan powered by a motor. Air inlets 42 can be provided inside the base of the housing in order to feed air inside the housing, the air flow driver blowing this air upwardly though a passage 23 to an air outlet hole 41 in direction of the 1 as illustrated by dotted lines arrows.

The heater 22 is operable to heat the flow of air generated by the air flow driver 21. In the specific illustrated embodiment, the heater is an electrical resistance positioned between the fan 21 and the bottom opening 11 of the chamber with the result that the flow of air is heated before it enters the chamber 1 to heat and to lift the beans. Other types of heater can be used such as an electrical resistor, a ceramic heater, a halogen source, a source of infrared and/or a source of microwaves.

The heater 22 and/or the air flow driver 21 is/are operable to apply a roasting profile to the beans, this roasting profile being defined as a curve of temperature against time.

When the chamber is mounted to the housing, the bottom of the chamber is tightly connected to the air outlet hole 41 to avoid that the flow of hot air flow leaks at the connection.

The top opening 12 of the chamber is connected to a smoke and particulates evacuation device (not illustrated).

Although the invention is described with a roaster implementing a fluidized bed of hot air, the invention is not limited to this specific type of roasting apparatus. Drum roasters and other kinds of roasters can be used.

The roasting apparatus comprises at least one temperature probe 5 to regulate the temperature of air supplied by the heating device 2. In the illustrated mode, this temperature probe is positioned outside the chamber 1 inside the conduit 23 guiding hot air supplied by the heating device 2 to the bottom of the chamber 11, that is upstream the chamber.

In an alternative less preferred mode, at least one temperature probe 51, 52 to regulate the temperature of air supplied by the heating device 2 can be positioned downstream the chamber. These probes can become dirtied by the smoke during roasting operation.

In another alternative less preferred mode, the apparatus can comprise several temperature probes 5, 51, 52 to regulate the temperature of air supplied by the heating device 2. The average or a weighted average of the measured temperatures is used to regulate the heating device 2.

The roasting apparatus 10 usually comprises a user interface 6 enabling the display and the input of information.

The roasting apparatus can comprise a code reader 7 to read a code associated to a type of coffee beans, for example present on the package of coffee beans. Preferably, this code reader is positioned in the apparatus so that the operator is able to easily position a code in front of it. It is preferably positioned at the front face of the apparatus, for example close to a user interface 6 of the apparatus. Accordingly, information provided by the code can be immediately displayed through the display of the user interface 6 positioned aside.

Control System of Roasting Apparatus

Figure 2A:
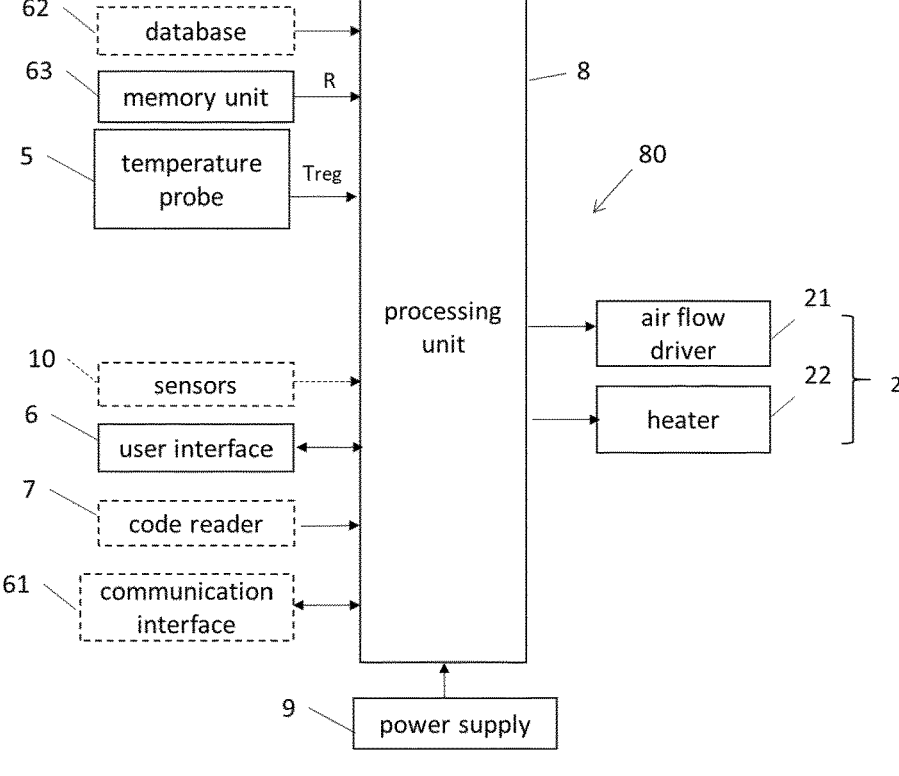
FIG. 2A shows a block diagram of a control system of the apparatus according to FIG. 1.
Figure 2B:
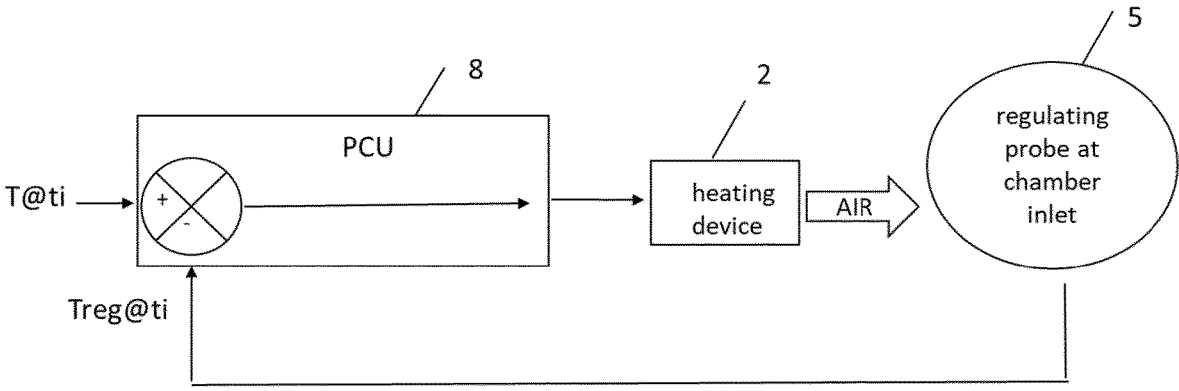
FIG. 2B illustrates the feedback loop of the temperature regulation.

With reference to FIGS. 1, 2A and 2B, the control system 80 will now be considered: the control system 80 is operable to control the components of the apparatus to roast coffee beans. The control system 80 typically comprises at a second level of roasting apparatus: the user interface 6, the processing unit 8, a temperature probe 5, a power supply 9, a memory unit 63, optionally a database 62, sensors 19, a communication interface 61 for remote connection, a code reader 7 or any combination of these devices.

The user interface 6 comprises hardware to enable a user to interface with the processing unit 8, by means of user interface signal. More particularly, the user interface receives commands from a user, the user interface signal transfers the said commands to the processing unit 8 as an input. The commands may, for example, be an instruction to execute a roasting process and/or to adjust an operational parameter of the roasting apparatus 10 and/or to power on or off the roasting apparatus 10. The processing unit 8 may also output feedback to the user interface 6 as part of the roasting process, e.g. to indicate the roasting process has been initiated or that a parameter associated with the process has been selected or to indicate the evolution of a parameter during the process or to create an alarm.

In addition, the user interface can be used to initiate a calibration mode of the roasting apparatus.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 6 can be formed as one unit or a plurality of discrete units.

A part of the user interface can also be on a mobile app when the apparatus is provided with a communication interface 61 as described below. In that case at least a part of input and output can be transmitted to the mobile device through the communication interface 61.

The sensors 19 and the temperature probe 5 are operable to provide an input signal to the processing unit 8 for regulating of the roasting process and/or a status of the roasting apparatus. The input signal can be an analogue or digital signal. The sensors 19 typically comprise at least one temperature sensor 5 and optionally one or more of the following sensors: level sensor associated with the chamber 1, air flow rate sensor, position sensor associated with the chamber and/or the chaff collector.

A code reader 7 can be provided and operable to read a code, for example on coffee beans package, and automatically provide an input that is the identification of the type Cn coffee beans introduced in the chamber 1.

The processing unit 8 generally comprise memory, input and output system components arranged as an integrated circuit, typically as a microprocessor or a microcontroller. The processing unit 8 may comprise other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programmed logic or to additionally comprise programmed logic. The processing unit 8 may also comprise one or more of the aforementioned integrated circuits. An example of the later is several integrated circuits arranged in communication with each other in a modular fashion e.g.: a slave integrated circuit to control the user interface 6 in communication with a master integrated circuit to control the roasting apparatus 10.

The power supply 9 is operable to supply electrical energy to the said controlled components and the processing unit 8. The power supply 9 may comprise various means, such as a battery or a unit to receive and condition a main electrical supply. The power supply 9 may be operatively linked to part of the user interface 6 for powering on or off the roasting apparatus 10.

The processing unit 8 generally comprises a memory unit 63 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 63 can be idealised as comprising a coffee beans roasting program.

The control system 80 is operable to apply this coffee beans roasting program by controlling the heating device 2—that is, in the particular illustrated embodiment of FIG. 1, the air flow driver 21 and/or the heater 22—using signal of the temperature probe 5.

The coffee beans roasting program can effect control of the said components using extraction information encoded on the code and/or other information that may be stored as data on the memory unit 63 or from a remote source through the communication interface 61 and/or input provided via the user interface 6 and/or signal of the sensors 19.

In particular, the control system 80 is configured to apply a roasting recipe $R_{set}$ providing the temperature $Tset_{@t1}$, $Tset_{@t2}, \ldots T_{set@tfinal}$ to be applied at discrete successive times $t_1, t_2, \ldots, t_{final}$ respectively.

With that aim, the processing unit 8 is operable to:
receive an input $T_{reg@ti}$ of the outside temperature probe 5,
process the input according to roasting recipe $R_{set}$,
provide an output, which is the roasting recipe $R_{set}$. More specifically the output comprises the operation of at least the heater 22 and the air flow driver 21.

The temperature measured by the temperature probe 5 is used to adapt the power of the heater 22 and/or the power of the air driver 21 in a feedback loop in order to apply the roasting recipe to the beans for example as illustrated in FIG. 2B.

In the illustrated closed feedback loop, the temperature $T_{reg\ @ti}$ measured at the outside temperature probe 5 is compared to the temperature $T_{reg\ @ti}$ of the roasting curve to be reproduced. Depending on the difference, the heating device 2 is operated to compensate the difference.

Depending on the type of control applied in the roaster, the heater 22 can be powered at one pre-determined power, meaning its temperature is constant, and in that case the power of the air driver 21 can be controlled based on the temperature regulated at the probe 5 in order to vary the time of contact of the flow air through the heater during its movement.

Alternatively, the air driver 21 can be powered at one pre-determined power, meaning the flow rate of air is constant, and in that case the power of the heater 22 can be controlled based on the temperature regulated at the probe 5 in order to heat more or less air during its passage through the heater.

In a last alternative, both heater 22 and air driver 21 can be controlled based on the regulation of the temperature by probe 5.

In addition, the control system can be configured to control the motor of the air driver to apply a roasting recipe $R_{flow}$ providing setpoints (F@$_{ti}$; $t_i$) of air flow $F_{@t1}$, $F_{@t2}, \ldots$ to be applied at discrete successive times $t_1, t_2, \ldots$, respectively.

Depending on the type of roasting apparatus and the air driver it comprises, the air flow can be controlled through the speed of the fan when the air driver comprises a fan with adjustable speed. Alternatively, the speed of the fan can be fixed and the flow of air can be controlled with a diaphragm or any means to control the size of air in a conduit.

The control system 80 can comprise a communication interface 61 for data communication of the roasting apparatus 10 with another device and/or system, such as a server system, a mobile device and/or a physically separated measuring apparatus 3. The communication interface 61 can be used to supply and/or receive information related to the coffee beans roasting process, such as roasting process information, type of the beans, quantity of beans. The communication interface 61 may comprise first and second communication interface for data communication with several devices at once or communication via different media.

The communication interface 61 can be configured for cabled media or wireless media or a combination thereof, e.g.: a wired connection, such as RS-232, USB, I2C, Ethernet define by IEEE 802.3, a wireless connection, such as wireless LAN (e.g. IEEE 802.11) or near field communication (NFC) or a cellular system such as GPRS or GSM. The communication interface 61 interfaces with the processing unit 8, by means of a communication interface signal. Generally the communication interface comprises a separate processing unit (examples of which are provided above) to control communication hardware (e.g. an antenna) to interface with the master processing unit 8. However, less complex configurations can be used e.g. a simple wired connection for serial communication directly with the processing unit 8.

The processing unit 8 enables access to different predefined roasting recipes ($R_{M_A}$, $R_{M_B}, \ldots$), the recipes being adapted to the roasting of specific types of coffee beans or coffee blends ($C_A, C_B, \ldots$) and preferably specific quantities ($M_A, M_B, \ldots$) of said beans or blends. These recipes can be stored in the memory 63 of the processing unit 8. Alternatively, these data can be stored in a remote server and the processing unit 8 can be supplied with access to this remote server through the communication interface 61, directly or indirectly through a mobile device establishing connection between the remote server and the processing unit. The control system 80 can comprise a database 62 storing information about coffee beans, in particular about the operation conditions for roasting specific coffee beans as described hereunder. The database 62 can be stored locally in the memory 63 of the control system of the roasting apparatus or remotely in a server accessible through the communication interface 63.

In one alternative embodiment, the control system can be provided with the roasting recipes $R_{M_n}$ (and depending on the embodiment with their associated specific quantities $M_n$) during a code reading operation, these pieces of information being encoded inside the code and decoded by the control system.

The pre-defined roasting recipes ($R_{M_A}$, $R_{M_B}$, . . . ) adapted to the roasting of specific types $C_n$ of coffee beans or coffee blends and specific weight of said beans are defined during an initial operation of roasting these specific beans inside a specific roasting apparatus defined as the master roasting apparatus (M). Usually, this operation is implemented by a coffee expert, who, based on his/her expertise in roasting, is able to define the parameters of temperature and time to optimally roast the specific beans and, as a result, to define the roasting recipe providing a set of points ($T_{set@ti}$; $t_i$) representing the temperature $T_{set@t1}$, $T_{set@2}$, . . . to be applied at predefined corresponding successive times $t_1$, $t_2$, . . . respectively.

Usually, the type Cn of the beans relates to at least one feature of the beans which has the direct impact on the process of roasting the beans.

The type of coffee beans can relate to specific features such as:

the origin of the beans and/or the botanical variety of the beans (Arabica, Robusta, . . . ) or a particular pre-existing mixture or blend of different beans; the pre-existing mixture or blend can be defined by the selection of different specific beans and/or by the ratio of these different specific beans.

the level of pre-roasting of the beans. The coffee beans to be roasted can be green beans or can be partially pre-roasted beans that is beans having been obtained by heating green coffee beans and stopping said heating process before the end of the first crack. These partially pre-roasted beans can be pre-roasted at different levels with a direct impact on the subsequent final roasting operated in the roasting apparatus.

the moisture of the beans, the size of the beans.

The types of beans can refer explicitly to the nature of the beans like the origin, the botanical variety, the blend, the level of pre-roasting, . . . and/or can be a reference like an identification number, a SKU number or a trademark.

Once these roasting recipes are pre-defined with the master roasting apparatus, they can be reproduced automatically with roasting apparatus similar to the master roasting apparatus. Logically, starting from the same beans and applying the same roasting recipes in roasting apparatuses similar to the master roasting apparatus, the same roasted coffee beans should be obtained. Yet, it has been observed that the reproduction of the roasting was not systematically consistent. Although the temperature probe 5 was perfectly calibrated to measure the correct temperature, non-consistency in the roasting of the same beans was observed between similar roasting apparatuses.

Several reasons were identified:

one is roasting in different external ambient conditions. The same roaster can be used in different countries in which ambient conditions can be very different or in some countries where ambient conditions are very different from one season to another. The external temperature can vary between less than 10° C. to up to 40° C., the humidity can vary between 30 and 90%.

This temperature directly influences the temperature of the external walls of the chamber, more or less heat will be required compared to a roasting apparatus operating at 25° C. due to heat exchanges of roasting device with ambient air. Accordingly, depending on the ambient temperature at which the master roasting apparatus M was used during the definition of the roasting profile, an adjustment of the heating is necessary to guarantee that the coffee beans are submitted to the same roasting profile inside the chamber and that the same final roasted beans are consistently obtained.

another reason relates to the roasting apparatus itself. Indeed, small differences usually appear between apparatuses during manufacturing. These differences can relate to the use of different key components of the apparatuses (fan, heater, temperature sensor) further to changes in supply sources or to small differences in the assembly of each apparatus, for example creating very small air leakages at various places, or due to the small differences in the relative positions of the key elements one to the other (in particular the temperature probe). As a result, although the flow of air introduced inside the chamber presented the right temperature as measured by the temperature probe 5, this flow of hot air was received differently inside the chamber with a direct impact on the roasting of the beans. The size of the roasting chamber, or batch size, can create differences too.

another reason is linked to the roasting apparatus powered by an electrical source. Depending on the country where the roasting apparatus operates, it is connected to a local electrical source, that varies around the world and that can be different from the electrical source applied to the master roasting apparatus. The frequency of this electrical source can impact some components of the apparatus in the manner they deliver heat to the roasting chamber, in particular a fan used as an air driver, that can deliver more or less air than expected during the reproduction of a roasting profile.

Consequently, a condition related to the country of use of the roasting apparatus can be taken into account.

another reason is linked to the roasting apparatus powered by at least one gas burners. Depending on the way the gas is supplied (gas bottle or gas supply line), the roasting apparatus can be supplied with different types of gas, supplied at different pressures and/or flows. In addition, pressure and flows can vary along time, particularly if gas is dispensed from a gas bottle.

another reason relates to the quantity of coffee beans present in the chamber during the roasting operation. The difference with the quantity used during the operation of definition of the roasting profile with the master roasting apparatus impacts the heat absorbed by each bean during the roasting operation if the same roasting profile is used. In addition, the fact of filling more or less the chamber 1 affects the movement of beans and hot air impacting the roasting too.

another reason relates to the moisture of the coffee beans at the moment they are introduced in the chamber for the roasting operation. As mentioned above, an expert defines roasting profiles with the master roasting apparatus, each roasting profile being determined for a specific type Cn of beans, for which the moisture level at the moment of definition of the roasting profile can be taken into account. This moisture property can be particularly important whether for green beans or for beans that are partially pre-roasted. Depending on the time spent since the beans were partially pre-roasted and the conditions of storage of that beans, the beans may absorb ambient humidity or lose humidity and their moisture level may be different. The percentage of water of the beans can vary by 2 to 3% in weight. The impact can be huge on pre-roasted beans that present usually a moisture level comprised between 3 and 5% in weight after pre-roasting and when their roasting profile is established with the master roasting apparatus.

The difference of moisture level has a direct impact on the heating of the beans during roasting and applying the roasting profile defined with the master roasting apparatus with beans at a certain level of moisture to beans presenting a different level of moisture will not lead to the expected consistent final roasted beans.

In order to solve these problems, a method has been developed to enable the correction of the temperature regulation loop of roasting apparatus so that said apparatus can reproduce consistently the roasting recipes defined with the specific master roasting apparatus.

Figure 3:
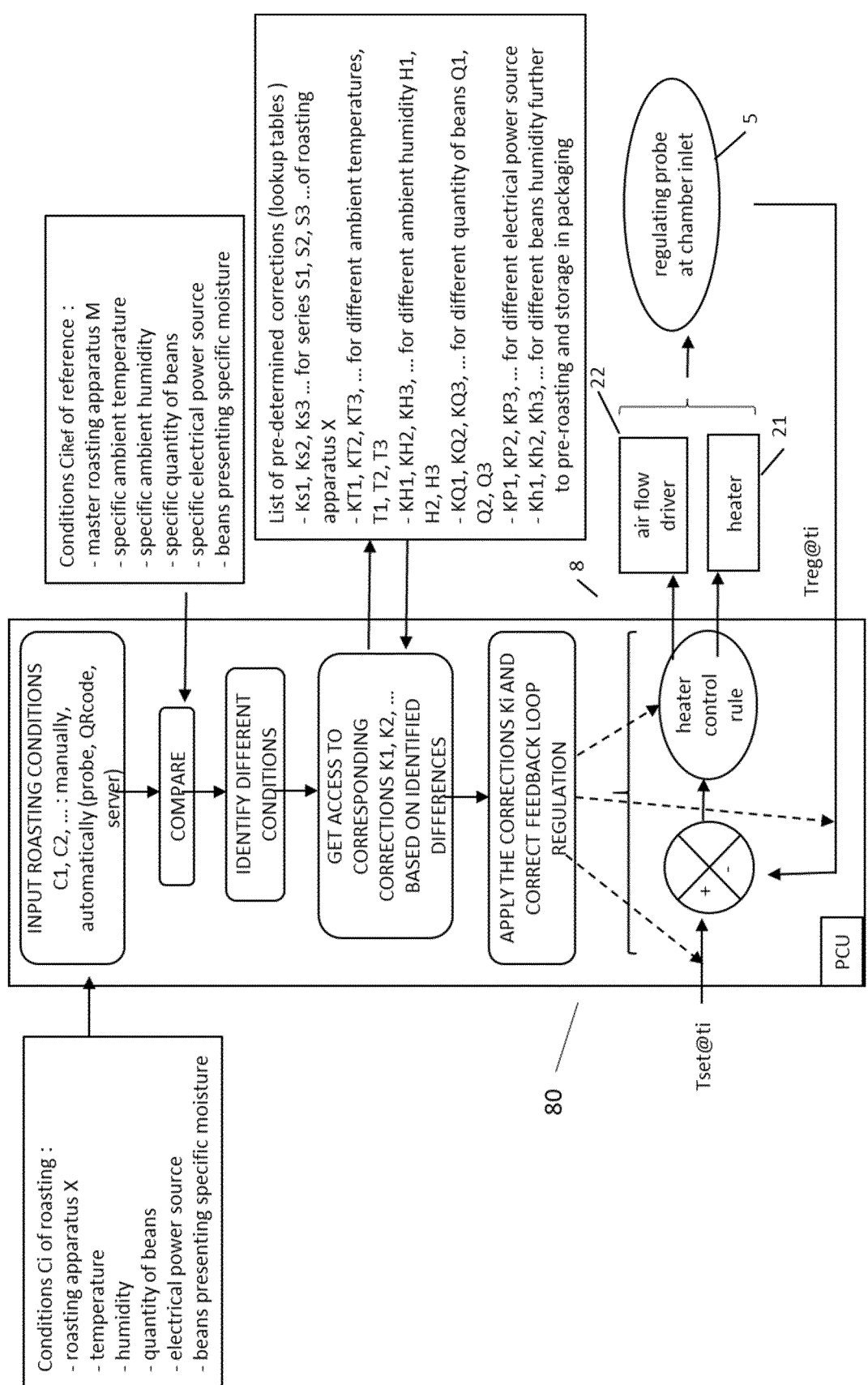
FIG. 3 illustrates the implementation of the method in an apparatus according to FIG. 1, FIGS. 4A to 4D illustrate a manner to pre-determine the correction Kc corresponding to the type of roasting apparatus.

FIG. 3 illustrates the implementation of the method by the control system 80 of an apparatus according to FIG. 1.

The control system is configured to roast coffee beans by reproducing a coffee beans roasting recipe specific to these coffee beans and defined by the temperatures $T_{set@ti}$ to be applied at different times $t_i$. This roasting recipe was defined with one specific master roasting apparatus M used in specific conditions called "Conditions of reference" and is accessible by the control system of the roasting apparatus for reproduction.

Before initiating the roasting operation, the control system is configured to obtain at least one of the current conditions Ci of roasting such as:

the manufacturing series of the roasting apparatus X
the ambient temperature, that is the temperature around the apparatus,
the ambient humidity, that is the humidity around the apparatus,
the quantity of beans introduced inside the chamber, the type of electrical power source to which the apparatus is connected
the moisture level of the beans introduced inside the chamber.

Some of these conditions can be supplied once to the control system 80 and stored in the memory 63, in particular the conditions that do not change from one roasting to another. These conditions can be supplied at the manufacturing step of the roasting apparatus or at the installation step of the roasting apparatus in the place of roasting (shop or restaurant). This type of conditions are for example: the manufacturing series of the roasting apparatus X, the type of electrical power source or other stable conditions like the altitude.

These conditions can be modified if necessary, for example after maintenance of the roasting apparatus and modification of the internal components or after moving the apparatus to another place. The new conditions can be modified manually or upgraded removably through a remote connection, for example during an upgrade of the control system.

Other conditions can be supplied periodically to the control system 80 and stored in the memory 63, such as the conditions that change with seasons like the ambient temperature and the ambient humidity. These conditions can relate to the date of the roasting operation. Other conditions can be supplied to the control system 80 at each roasting operation, such as the ambient temperature, the ambient humidity, the quantity and the moisture level of the beans introduced in the chamber.

These conditions can be supplied manually through the user interface 6 or automatically depending on the roasting apparatus. The apparatus can comprise sensors to measure ambient temperature and ambient humidity and input that conditions to the control system. These sensors can be positioned remotely from the apparatus and provide that conditions through remote connection. The roasting apparatus can be connected with a weather station for example.

The quantity of beans can be provided through a connected scale as mentioned above.

The moisture level of the beans can be provided through a sensor either directly if the sensor is part of the roasting apparatus or is connected to the control system of the roasting apparatus or indirectly if the operator reads and inputs the level read from a separate device configured to measure the moisture level of coffee beans. The moisture level can also be empirically predicted based on time elapsed since the pre-treatment of the beans. For example, the moisture uptake can be estimated from typical weekly variations based on experimental measures done in labs. By inputting the date of pre-treatment of the beans, for example read from the beans container, the control system can be configured to estimate the current moisture level of the beans. Alternatively, a tracker on the beans packaging can be configured to provide this piece of information, that is made accessible for the operator. In particular, the place of production of the beans (the factory) can be taken into account.

Then the control system is configured to compare each of said supplied conditions Ci of roasting with the corresponding conditions of reference $Ci_{Ref}$ applied during the definition of the roasting recipes with said master roasting apparatus (M). These conditions of reference $Ci_{Ref}$ can be stored in the memory of the control system or stored in a server accessible through a remote connection or can be part of the code of package. Different conditions can be stored at different places.

Then, if a difference is identified between one of the conditions of roasting and the corresponding condition of reference, then, based on said identified difference, the control system is configured to get access to a corresponding pre-determined correction $K_{Ci}$ specific to said condition of roasting and said identified difference.

The correction Kci is pre-determined for a specific condition (ambient temperature for example) and for a specific difference or a specific range of $\Delta$ between the current condition Ci and the condition of reference $Ci_{Ref}$ (a difference of temperature +5° C. for example). Predetermined corrections Kc can be stored under the form of lookup tables providing Kc in function of the type of condition and the difference with the condition of reference.

For example, a lookup table for pre-determined corrections specific to ambient temperatures can be illustrated as follows in view of an ambient temperature of reference implemented at 20° C.:

the correction $a_{Temperature}$ can be a fixed value specific to a range of temperature:

| Amb. temp. (° C.) | 5-10 | 10-15 | 15-20 | 20-25 | 25-30 | 30-35 | 35-40 |
|---|---|---|---|---|---|---|---|
| Correction $a_{Temperature}$ | 1.03 | 1.01 | 1 | 1 | 1 | 0.99 | 0.99 | or the correction $a_{Temperature}$ can be defined to vary with time during the reproduction of a roasting recipe, in particular the coefficients can be different over different time intervals, as mentioned in hereunder:

| Amb. temp. (° C.) | 5-10 | 10-15 | 15-20 | 20-25 | 25-30 | 30-35 | 35-40 |
|---|---|---|---|---|---|---|---|
| Correction $a_{Temperature}$ | 1.03 | 1.01 | 1.01 for t < 3' <br> 1 for t > 3' | 1 | 1 for t < 3' <br> 0.99 for t > 3' | 0.99 | 0.99 | or the correction $a_{Temperature}$ can be defined to vary with temperature during the reproduction of a roasting recipes, in particular the coefficients can be different over different temperature intervals, as mentioned in hereunder:

| Amb. temp. (° C.) | 5-10 | 10-15 | 15-20 | 20-25 | 25-30 | 30-35 | 35-40 |
|---|---|---|---|---|---|---|---|
| Correction $a_{Temperature}$ | 1.03 | 1.01 | 1.01 for T < 100° C. <br> 1 for T > 100° C.' | 1 | 1 for T < 100° C. <br> 0.99 for T > 100° C. | 0.99 | 0.99 |

Then the control system is configured to apply said accessible corresponding pre-determined correction $K_{Ci}$ to the feedback loop regulation.

If the control system gets access to several pre-determined correction $K_{Ci}$ because several differences are identified between the conditions of roasting and the corresponding conditions of reference, then said several corrections are applied to the feedback loop regulation The correction(s) can be applied to the temperature $T_{reg}$ measured by the temperature probe 5 or to the temperatures $T_{set@ti}$ provided by the roasting recipes to be reproduced. The correction provided to the control system may be adapted depending if it is applied to $T_{reg}$ or $T_{set@ti}$ as detailed below.

The correction Kci for a specific condition and difference can be pre-determined by coffee experts based on their knowledge in the adaptation of roasting profiles depending on different conditions. For example:

roasting in cold ambient environment can be compensated by applying more heat to the chamber due to heat loss through the walls of the chamber. A correction of the feedback loop by applying a correction with a coefficient $ac_{temperature}$ superior to 1 can be applied. The value may depend on the size of the chamber and the material of the walls.

roasting coffee beans presenting a moisture level higher than expected can be compensated by applying more heat to the chamber. A correction of the feedback loop by applying a correction with a coefficient: $ac_{beans\ moisture}(t)$, that varies with time during the reproduction of the roasting profile. for example wherein $ac_{beans\ moisture}(t)$ is superior to 1 during a first period of the roasting profile and then equal to 1 during the rest of the time of the roasting profile.

Alternatively, each correction Kci for a specific condition and difference can be pre-determined by operating the master roasting apparatus in a state where this specific condition differs by this specific difference from the condition of reference $Ci_{Ref}$, establishing the impact on the roasting of the coffee beans and deducing the corresponding correction to be applied in the control regulation loop to compensate this impact.

If no difference is identified between the conditions, the control system reproduces the roasting recipes Rset defined with one specific master roasting apparatus (M).

FIGS. 4A to 4D illustrate a manner to pre-determine the correction Kc corresponding to the use of a roasting apparatus X part of a new manufacturing series of roasting apparatuses. The apparatuses are similar to the master apparatus but new types of internal components have been used.

These apparatuses comprise one temperature probe 5 positioned outside the chamber 1 meaning that these types of apparatuses are particularly sensitive to variations in the way hot air is supplied to the chamber or to ambient conditions (temperature, humidity) compared to apparatuses where the temperature probe 5 is positioned inside the chamber and are in contact with beans.

For new manufactured apparatuses, a correction Kci specific to the series can be pre-determined by introducing a temporary temperature probe 3 in the chamber 1 so that the measure of the temperature inside the chamber $T_{cal}$ is provided.

Before the process of pre-determining the correction for the apparatus X, in a preliminary stage, a pre-determined calibration curve $R_{ref}$ is established with the master roasting apparatus M as illustrated in FIG. 4A.

During this stage, the heating device 2 of the roasting apparatus M is controlled to reproduce a preset curve $R_{set}$, said preset curve providing a set of points ($T_{set@ti}$; $t_i$) representing the temperature $T_{set@t1}$, $T_{set@t2}$, $\ldots T_{set@tfinal}$ to be applied at predefined corresponding successive times $t_1$, $t_2$, $\ldots$ , $t_{final}$ respectively. This control is based on the temperature $T_{reg}$ regulated by the first temperature probe 5.

During the reproduction of the preset curve $R_{set}$, the temperature $T_{ref}$ in the chamber is measured in function of time at the temporary temperature probe 3. This measure enables the determination of at least a set of points ($T_{ref@ti}$; $t_i$) illustrated in FIG. 4C by the curve $T_{ref}$ corresponding to the pre-determined calibration curve $R_{ref}$.

In the same manner, during the process of pre-determining the correction for the apparatus X illustrated in FIG. 4B, the heating device 2 of the system of the roasting apparatus X is controlled to reproduce the same preset curve $R_{set}$. This control is based on the temperature $T_{reg}$ regulated by the first temperature probe 5.

During the reproduction of the preset curve $R_{set}$, the temperature $T_{cal}$ in the chamber 1 is measured in function of time at the temporary temperature probe 3. This measure enables the determination of at least a set of points ($T_{cal@ti}$; $t_i$) illustrated in FIG. 5C by the curve $T_{cal}$. In the process of pre-determining the correction of the roasting apparatus X, the temperature $T_{cal@ti}$ is compared with the temperature $T_{ref@ti}$ obtained with the master roasting apparatus M at at least one same time $t_i$. FIG. 4C illustrates the curves or sets of points corresponding to:

the preset curve $R_{set}$, the temperature $T_{ref@ti}$ in the chamber of the master roasting apparatus during the reproduction of the preset curve $R_{set}$, establishing the curve $R_{ref}$, and the temperature $T_{cal@ti}$ in the chamber of the roasting apparatus X during the reproduction of the same preset curve Rset.

FIG. 4C makes apparent how the reproduction of the same preset curve $R_{set}$ differs from one apparatus to another. This difference can be explained by differences in the manufacturing process.

The correction of the roasting apparatus X can be pre-determined based on the comparison between $T_{cal}$ and $T_{ref}$.

Different types of correction can be applied depending on the relationship between $T_{cal}$ and $T_{ref}$. The complexity of the relationship can depend on: the differences of construction between the roasting apparatus and the master roasting apparatus such as the use of another type of heater, another shape of chamber, another control rule or algorithm to control the heater (e.g. more complex if there are 2 degrees of control on air flow driver and heater) providing for example a more sensitive control.

The relation is usually determined though regression analysis and implemented by means of a regression analysis software using well-known analysis models such as linear regression, multiple regression, non-linear regression, polynomial regression, . . .

Once the relationship between $T_{cal}$ and $T_{ref}$ is defined, the pre-determined correction can be applied to the rule or algorithm applied by the feedback loop regulation. The correction can be applied at different steps of this rule depending on the complexity of this rule. In the simplest embodiments, preferably the correction is applied to the temperature $T_{reg}$ measured by the temperature probe 5 or to the temperatures $T@_{ti}$ provided by the roasting recipes to be reproduced.

In the case of roasters M and X illustrated in FIGS. 5A and 5B, where both roasters comprise very similar components with a simple feedback loop control operating the heater 22 only based on the temperature measured by the temperature probe 3 a factor of correction can be defined through the ratio K at time $t_{final}$:

$$\frac{T_{cal@tfinal}}{T_{ch@tfinal}}$$

Figure 4D:
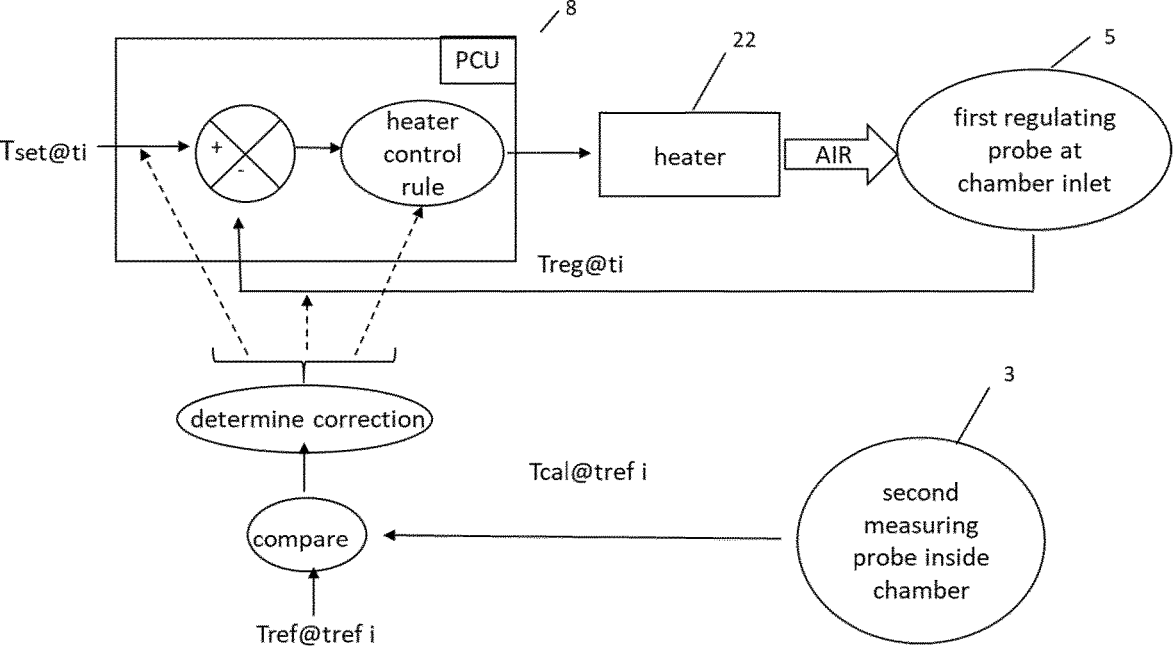

As illustrated in FIG. 4D, this ratio can be used as simple multiplication factor of the temperature $T@_{ti}$ provided by the roasting recipes to be reproduced before being compared to $T_{reg}$ in the feedback loop regulation.

In another embodiment of the invention, the inverse of the above ratio, that is $$\frac{1}{K},$$

can be used as multiplication factor of the temperature $T_{reg}$ measured by the first temperature probe 5, before this temperature being compared to $T@_{ti}$ in the feedback loop regulation.

The correction enables the control system of the apparatus X to supply hot air inside the chamber at a temperature that is closer to the temperature $T_{ref}$ obtained in the master apparatus.

Figure 5:
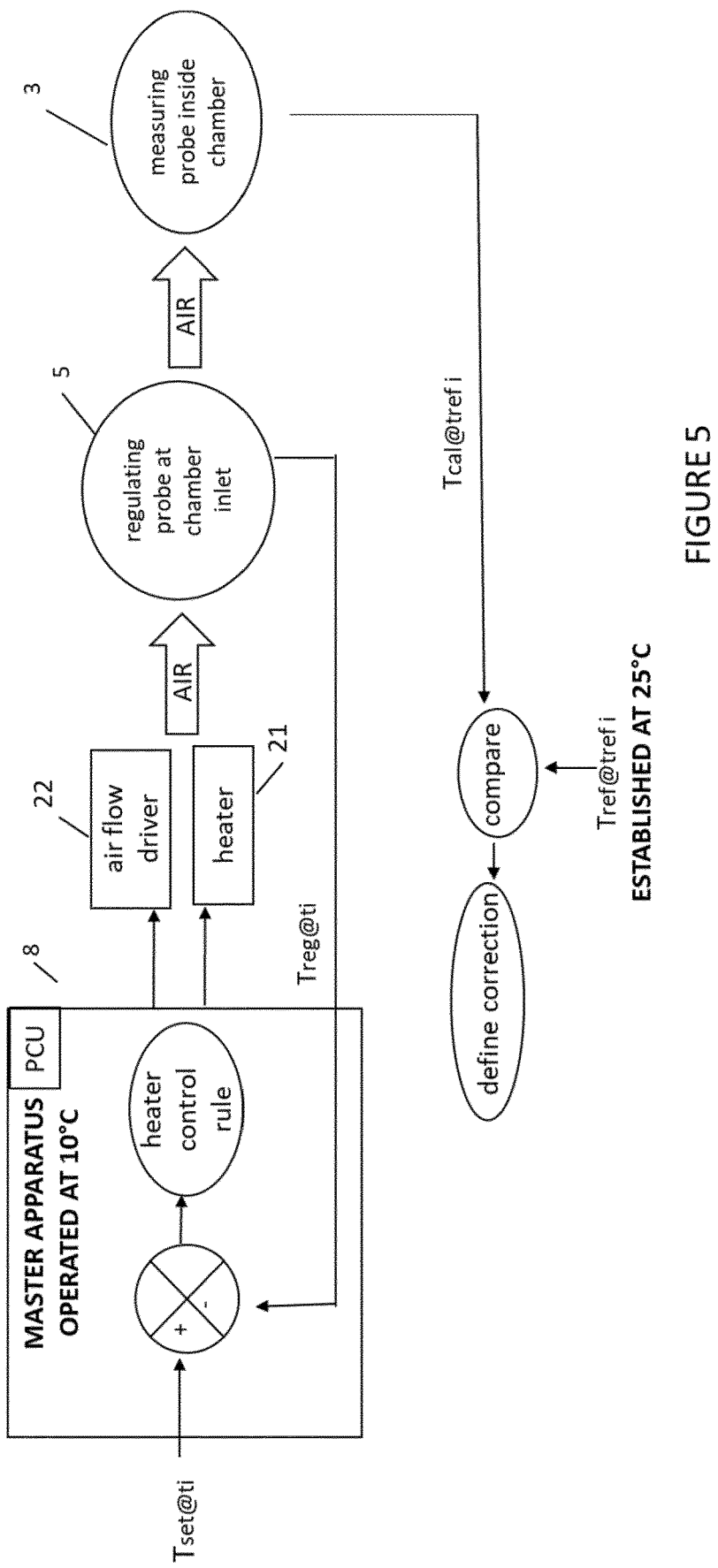
FIG. 5 illustrates a manner to pre-determine the correction Kc corresponding to ambient temperature.

FIG. 5 illustrates a manner to pre-determine one correction Kc corresponding to a difference of ambient temperature with the same roasting apparatus X. The process implemented in FIGS. 4A to 4C is reproduced except that in FIG. 4B, it is the master roasting apparatus M that is operated with an ambient temperature of 10° C., whereas in FIG. 4A the reference curve was established at an ambient temperature of 25° C. During the operation illustrated in FIG. 4B, all the other conditions are identical to the conditions of reference implemented in the operation of FIG. 4A. Based on the comparison between $T_{cal}$ and $T_{ref}$, a correction K specific to a difference of −15° C. with the ambient temperature of reference is pre-determined. This correction is stored in a memory or database and is accessible to the control system of the roasting apparatus X.

When this apparatus is operated to roast beans within an ambient temperature of 10° C., the accessible predetermined correction is applied to the feedback loop regulation.

In addition, the accessible predetermined correction relative to the manufacturing series is applied to the feedback loop regulation too.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

roasting apparatus 10
    roasting chamber 1
    bottom opening 11
    top opening 12
    heating device 2
    air flow driver 21
    heater 22
    passage 23
    temporary temperature probe 3
    housing 4
    air outlet hole 41
    air inlets 42
    vertical housing part 43
    temperature probe 5, 51, 52
    user interface 6
    code reader 7
    processing unit 8
    control system 80
    power supply 9
    sensor 19
    communication interface 61
    database 62
    memory unit 63

The invention claimed is:

1. A method of roasting coffee beans with a roasting apparatus, the roasting apparatus comprising:

a chamber configured to contain coffee beans, a heating device configured to supply hot air to the chamber, at least one temperature probe to measure a temperature of hot air supplied by the heating device, a control system configured to control the heating device and configured to reproduce roasting recipes, the roasting recipes representing a temperature to be applied at discrete successive times, respectively, the control of the heating device implementing a feedback loop regulation based on the temperature measured by the at least one temperature probe, wherein, before implementing a new operation of roasting coffee beans with the roasting apparatus by reproducing the roasting recipes, the roasting recipes providing at least a set of points defined with one specific master roasting apparatus, the feedback loop regulation is adjusted according to, the steps of:

supplying at least one of a plurality of conditions of the new operation of roasting, comparing each supplied condition of the new operation of roasting with a corresponding condition of reference as originally applied when defining the roasting recipes with the one specific master roasting apparatus, if a difference is identified between the supplied condition of the new operation of roasting and the corresponding condition of reference, then:

based on the identified difference, receiving a corresponding pre-determined correction specific to a nature and a difference of the condition of roasting with the corresponding condition of reference, and applying the corresponding pre-determined correction to at least one of the temperatures of the roasting recipes to be reproduced by the roasting apparatus.

2. The method of roasting coffee beans according to claim 1, wherein the at least one temperature probe is positioned outside the chamber.

3. The method of roasting coffee beans according to claim 1, wherein the coffee beans roasting recipes defined with the specific master roasting apparatus are roasting recipes adapted to the roasting of one pre-determined quantity of beans of same type and providing the temperatures to be applied at discrete successive times respectively.

4. The method of roasting coffee beans according to claim 1, wherein the at least one of the conditions of roasting adapts to at least one feature selected from the group consisting of:

the external ambient conditions;

the type of roasting apparatus used;

if the heating device is electrically powered, the type of source of power, the frequency or the voltage;

if the heating device is powered by at least one gas burners, the parameters of supply of the gas;

the characteristics of the coffee beans to be roasted; and the characteristics of the desired aroma profile such as the level of roasting.

5. The method of roasting coffee beans according to claim 1 wherein, depending on the type of correction, the feedback loop regulation is adjusted at installation, periodically and/or before each roasting operation.

6. The method of roasting coffee beans according to claim 1 wherein, during the new operation of roasting coffee beans with the roasting apparatus, at least one of the conditions of the new operation of roasting is monitored, and if the at least one monitored condition changes during the new operation of roasting coffee beans, then the steps of the operation of adjustment are implemented again.

7. The method of roasting coffee beans according to claim 1 wherein the pre-determined correction specific to one condition of the new roasting operation is defined by a coefficient, and the correction is directly applied to temperatures $T_{set}$ provided by the roasting recipes defined with the specific master roasting apparatus and to be reproduced, the correction comprising replacing $T_{set}$ by $\alpha_{ci} T_{set}$ in the feedback loop regulation, or the correction is indirectly applied to temperatures $T_{reg}$ measured by the at least one temperature probe, the correction comprising replacing $T_{reg}$ by $$\frac{T_{reg}}{a_{ci}}$$

in the feedback loop regulation, wherein $\alpha_{ci}$ is a pre-determined factor specifically pre-determined for the condition and the identified difference, or is equal to 1 by default.

8. The method of roasting coffee beans according to claim 1 wherein the operation of adjustment comprises the steps of:

supplying several of the at least one specific conditions of roasting, comparing each one of the specific conditions of roasting with the corresponding condition of reference used during a definition of the roasting recipes defined with the specific master roasting apparatus, if for more than one of the specific conditions of roasting, a difference is identified between the specific condition of roasting and the corresponding condition of reference, then:

based on each of the identified differences, getting access to the corresponding pre-determined corrections specific to conditions of roasting, based on a selection of the corresponding pre-determined corrections, applying a correction K to the feedback loop regulation, the correction K being defined by a coefficient A wherein $$A=\Pi_i \alpha_{ci.}$$

9. The method of roasting coffee beans according to claim 1, wherein the coffee beans are a mixed blend of at least two different varieties of coffee beans introduced inside the chamber, and wherein the control system is configured to obtain for each type of coffee beans coffee n comprised in the blend at least the type coffee n of the coffee beans and a quantity $m_n$ of the type of coffee NN introduced in the chamber, and if for at least one type of the coffee n part of the blend, at least one difference is identified between a specific condition $C_{coffee\ i}$ of roasting related to a characteristic of said coffee n and the corresponding condition of reference $C_{coffee\ i\ Ref}$ of roasting related to the characteristic of the coffee n then a global coefficient $\alpha c_{coffee\ i\ blend}$ for a correction $Kc_{coffee\ i}$ specific to the condition $C_{coffee\ i}$ of roasting for the blend is calculated, the global coefficient being calculated as follows:

$$a_{C\ coffee\ i\ blend} = \sum_{n=A}^{N} f_n \cdot a_{C\ coffee\ i\ n}$$

wherein n corresponds to all the types of coffee beans $C_A$ to $C_N$ present in the blend and $f_n$ represents the fraction in weight of coffee beans of type $C_n$ in the blend of coffee beans.

10. The method according to claim 7 wherein a pre-determined correction $K_{ci}$ specific to one condition Ci of roasting applied to the feedback loop regulation is defined by an additional coefficient ($b_{ci}$), and the correction is applied to the temperatures $T_{set}$ provided by the roasting recipes to be reproduced, the correction comprising replacing $T_{set}$ by $$\alpha_{ci} T_{set} + b_{ci}$$

in the feedback loop regulation, or the correction is applied to the temperatures $T_{reg}$ measured by the at least one temperature probe, the correction comprising replacing $T_{reg}$ by $$\frac{1}{a_{ci}}(T_{reg} - b_{ci})$$

in the feedback loop regulation, wherein $b_{ci}$ is a pre-determined offset specifically pre-determined for the condition Ci and the identified difference or is equal to 0 by default.

11. The method according to claim 1 wherein in the operation of adjustment comprises the steps of:

supplying several of the at least one specific conditions of roasting Ci, comparing each one of the specific conditions of roasting Ci with the corresponding condition of reference $Ci_{Ref}$, used during the definition of the roasting recipes defined with the specific master roasting apparatus, if for more than one of the specific conditions $C_i$ of roasting, a difference is identified between the specific condition of roasting and the corresponding condition of reference, then:

based on each of the identified differences, getting access to the corresponding pre-determined corrections $K_{ci}$ specific to conditions Ci of roasting, based on the selection of said corresponding pre-determined corrections $K_{ci}$, applying the correction K to the feedback loop regulation, said correction K being defined by the couple of coefficients (A, B), wherein:

$$A = \Pi_i \alpha_{ci}$$

and $$B = \Sigma_i b_{ci}.$$

12. The method according to claim 7, wherein, in the coefficients $\alpha_{ci}$, and optionally $b_{ci}$, defining a correction $K_{ci}$, at least one of the coefficients varies with time during the reproduction of roasting recipes.

13. The method according to claim 7, wherein, in the coefficients $\alpha_{ci}$, and optionally $b_{ci}$, defining a correction $K_{ci}$, at least one of the coefficients varies with temperature during the reproduction of roasting recipes.

14. The method of roasting coffee beans according to claim 1, wherein the pre-determined correction $K_{ci}$ specific to one condition Ci of the new roasting operation is defined by a coefficient $D_{ci}$, $A_{ci}$, and $B_{ci}$ and the coefficients are directly applied to the temperatures $T_{set}$ provided by the roasting recipes defined with the specific master roasting apparatus and to be reproduced, the correction comprising replacing $T_{set}$ by $$D_{ci} T_{set}^2 + A_{ci} T_{set} + B_{ci}$$

in the feedback loop regulation, wherein $D_{ci}$ is a pre-determined factor specifically pre-determined for the condition Ci and the identified difference, or is equal to 0 by default, wherein $A_{ci}$ is a pre-determined factor specifically pre-determined for the condition Ci and the identified difference, or is equal to 1 by default, wherein $B_{ci}$ is a pre-determined factor specifically pre-determined for the condition Ci and the identified difference, or is equal to 0 by default.

15. The method according to claim 1 wherein in the roasting apparatus, the at least one temperature probe is positioned outside the chamber and each pre-determined correction specific to one condition of roasting and one identified difference is pre-determined by:

$a_0$—applying the one identified specific difference of condition to the master roasting apparatus without modifying the other conditions of reference, a—introducing at least one temporary temperature probe inside the chamber of the master roasting apparatus, b—controlling the heating device to reproduce a preset curve $R_{set}$, said preset curve providing a series of points ($T_{set@ti}$; $t_i$) representing the temperature $T_{set@t1}$, $T_{set@2}$, ... $T_{set@tfinal}$ to be applied at preset corresponding successive times $t_1$, $t_2$, . . . , $t_{final}$ respectively, the control being based on a temperature $T_{reg}$ measured by the temperature probe, c—during the reproduction of the preset curve $R_{set}$, measuring a temperature $T_{cal}$ in function of time inside the chamber at the temporary temperature probe enabling the determination of at least a set of points ($T_{cal@ti}$; $t_i$), d—comparing a temperature $T_{cal@ti}$ measured at least one time titi with the temperature $T_{ref@ti}$ $t_i$ at said same time titi of a pre-determined reference curve $R_{ref}$ obtained with the master roasting apparatus, the reference curve $R_{ref}$ representing a temperature $T_{ref}$ measured in the chamber of the specific master apparatus in the conditions of reference while controlling the heating device of the master apparatus to reproduce the preset curve $R_{set}$, based on the comparison, determining the correction specific to the condition of roasting and said difference.

16. The method according to claim 1 wherein the heating device comprises an air flow driver and the control system is operable to control the air flow driver and is configured to apply a roasting recipe ($R_{Flow-set}$) providing setpoints to be applied at discrete successive times, and the operation of adjustment comprises the steps of:

if a difference is identified between the supplied condition Ci of a new operation of roasting and the corresponding condition of reference $Ci_{Ref}$, then:

based on said identified difference, getting access to a corresponding pre-determined correction $K_{Flow\ Ci}$ specific to a nature and a difference with $Ci_{Ref}$ of the condition of roasting, and applying the corresponding pre-determined correction $K_{Flow\ Ci}$ to at least one of the air flow $F_{set@ti}$ of the roasting recipes to be reproduced by the roasting apparatus.

17. The method according to claim 1, wherein the corresponding pre-determined correction specific to the nature and the difference of the condition of roasting with the corresponding condition of reference is accessed from a remote server directly or indirectly through a mobile device establishing connection between the remote server and a processing unit.

* * * * *